Dec. 17, 1935.　　C. E. CARPENTER ET AL　　2,024,428
DOUGHNUT MACHINE
Filed March 28, 1935　　2 Sheets-Sheet 1
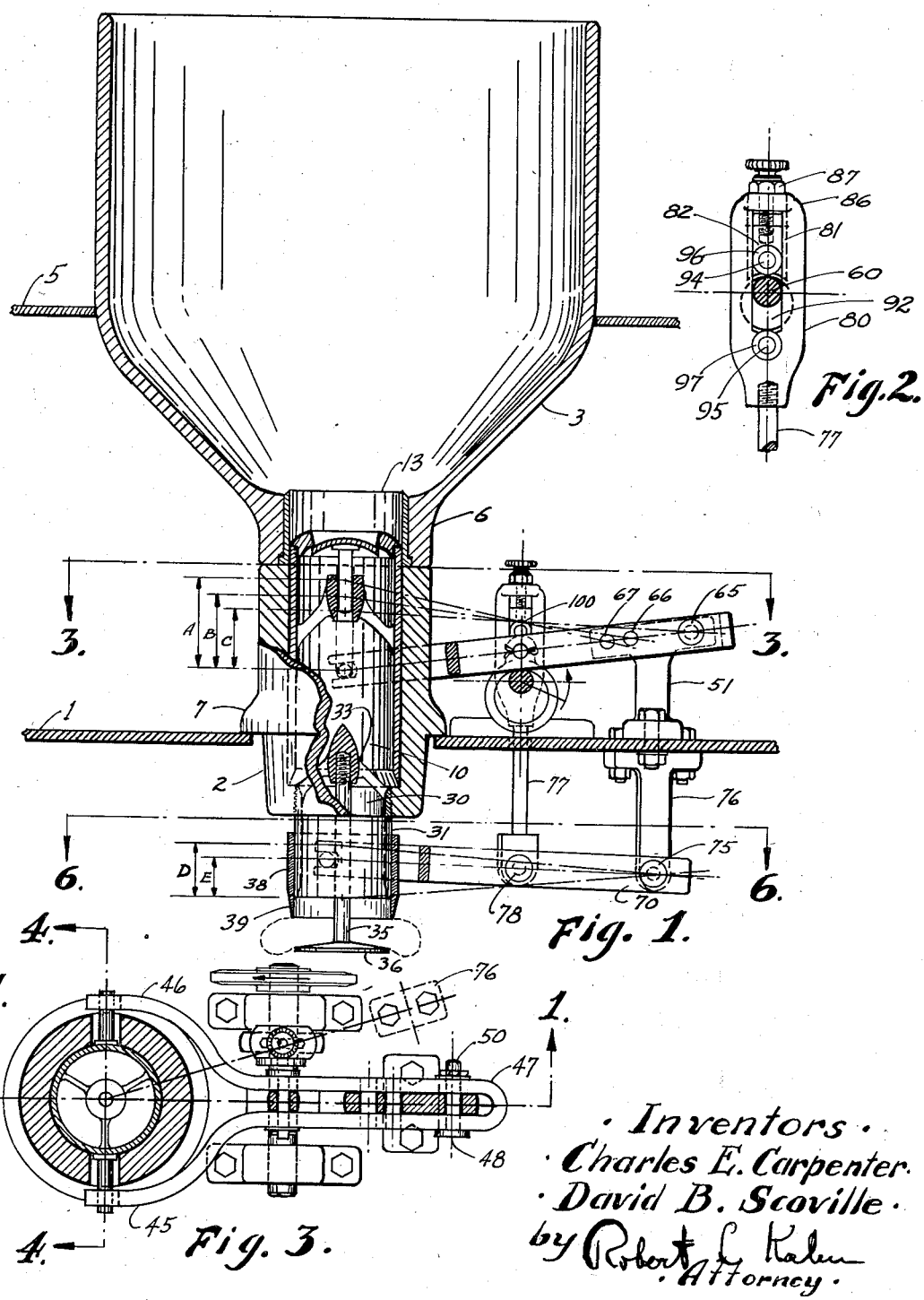

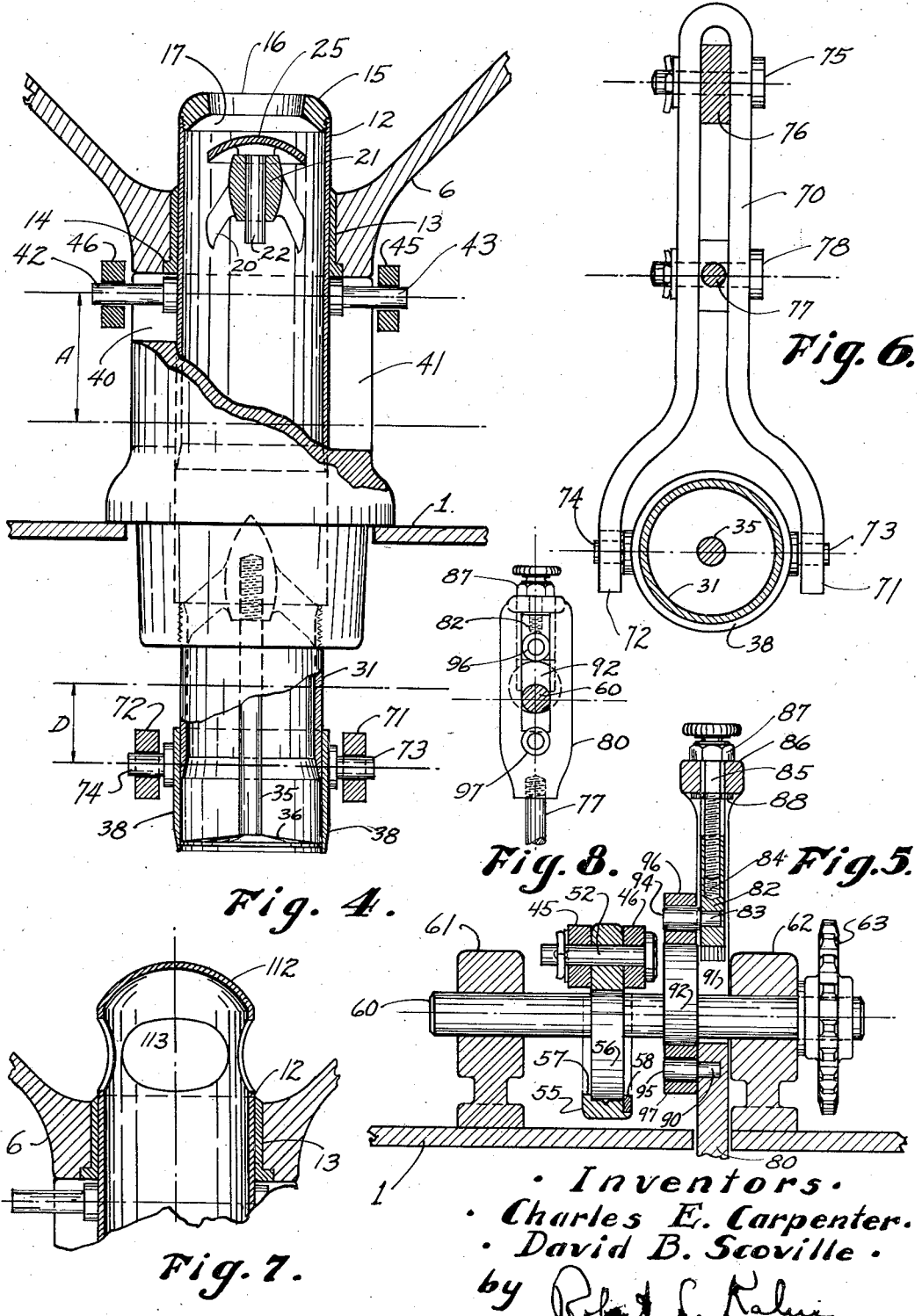

Patented Dec. 17, 1935

2,024,428

UNITED STATES PATENT OFFICE 2,024,428

DOUGHNUT MACHINE

Charles E. Carpenter and David B. Scoville, Crystal Lake, Ill.; said Scoville assignor to said Carpenter Application March 28, 1935, Serial No. 13,413

18 Claims. (Cl. 107—14)

This invention relates to doughnut machines and more particularly to the cutting mechanism of such a machine. The cutter herein described is adapted to be used with any type of doughnut machine and may, if desired, be incorporated in the machine shown in Patent 1,641,118, granted August 30, 1927, to Charles E. Carpenter. The invention hereinafter described provides a cutter which is simple, cheap to manufacture and which is adapted to operate with a minimum amount of disturbance to the dough batch.

Previous machines have been provided with cutters which have had piston mechanism reciprocable in the dough batch, resulting in an undesirable agitation of the dough. Furthermore, such cutters, have a large number of operative and movable parts in the dough, and are difficult to clean.

An object of this invention is to devise a cutter with a minimum number of operating parts, which will create little or no agitation whatever in the dough batch. A further object is to devise such a cutter having adjustments which may be readily changed, so that the size and consistency of the doughnut blank may be varied within wide limits. An additional object is to devise a cutter which will be cheap to manufacture, will have a long useful life which has a minimum of movable parts and which may be disassembled for cleaning and reassembled with little trouble. A further object is to devise a cutter wherein a single shell functions to suck the dough in from the main dough batch and thereafter expels a suitable doughnut blank. Other and additional objects will become apparent as the description proceeds.

Referring to the drawings:

Figure 1 is an elevation view in section on line 1—1 of Figure 3. Figure 2 is a detail. Figure 3 is a view partly in section, looking down upon the machine, taken along line 3—3 of Figure 1. Figure 4 is an enlarged sectional view of the cutter taken on line 4—4 of Figure 3. Figure 5 is a sectional view along the line 5—5 of Figure 3. Figure 6 is a view along line 6—6 of Figure 1. Figure 7 is a detail of a modified form of valve and Figure 8 is a detail similar to Figure 2 but with the mechanism differently adjusted.

While the drawings do not show a complete doughnut making machine, including the frying pan and turning mechanism, it is understood, of course, that the structure hereinafter described may be used in connection with any such mechanism and more particularly with the mechanism disclosed in the hereinbefore referred to patent.

Mounted on a base plate 1 of iron or some suitable metal is a hollow sleeve 2, supporting at its upper end a hopper 3. This hopper may have its top open or closed and may be steadied by a plate 5.

Hopper 3 is provided with a discharge throat 6, which is adapted to rest on or be secured to sleeve 2, so as to telescope therewith. The entire mechanism may be suitably supported on plate 1 by means of a flange 7 on sleeve 2.

Sleeve 2 has a cylindrical chamber 10 therein, in which there is disposed a thin cylindrical shell 12. Cylindrical shell 12 is adapted to be reciprocated longitudinally of sleeve 2 and bears against the inside wall of sleeve 2 and a bearing sleeve 13 disposed on the inside of throat 6. Bearing sleeve 13 is preferably formed with an enlarged lip 14 at the bottom thereof, fitting into a suitable channel in throat 6 to lock the same in place. The inside surface of sleeve 2, together with the inside sleeve of bearing sleeve 13 forms a smooth, cylindrical chamber within which shell 12 may be reciprocated.

It will be noted that shell 12 is somewhat shorter than the combined lengths of sleeve 2 and throat 6. At its upper end shell 12 carries a valve seat 15. Valve seat 15 is provided with an opening 16 giving access to the interior of shell 12. The inside surface 17 of valve seat 15 is the valve seat proper and is preferably formed as an annular spherical surface. Carried by shell 12 within the upper portion thereof, is a spider 20, having a centrally disposed bearing 21. This bearing carries a pin 22, freely slidable therein and at the upper portion of the pin there is mounted a mushroom valve 25. Mushroom valve 25 is formed as a spherical surface, and when raised, is adapted to seat against surface 17 and seal shell 12 at the upper portion thereof.

The bottom of sleeve 2 is provided with an opening 30 here shown as circular and somewhat smaller in diameter than the inside wall of sleeve 2 although, of course, this is not important. Into opening 30 cylindrical sleeve 31 is disposed in any suitable fashion, such as by screw threads on both members. The upper end of small sleeve 31 is provided with a spider 33, which supports an elongated rod 35 in the center of said sleeve. The bottom of rod 35 carries a doughnut cutter 36, consisting of a dished metal member supported at the central portion of the convex side as shown in the drawings. It will be noted that cutter 36 extends a substantial distance below the bottom end of small sleeve 31 and together therewith forms an annular discharge opening.

Small sleeve 31 preferably has its outer surface machined to provide a smooth bearing surface on which is slidably mounted a small valve shell 38. The bottom edge 39 of valve shell 38 is tapered to a cutting edge and is adapted to be reciprocated up and down along the outside of shell 31 toward cutter 36 and away therefrom forming in effect a discharge valve for the extrusion of doughnut blanks.

In order to reciprocate shell 12, sleeve 2 is provided with two diametrically opposed longitudinal slots 40 and 41 which expose the outer surface of sleeve 12. Rigidly carried by sleeve 12 on these two exposed surfaces, are pins 42 and 43, adapted to project beyond sleeve 2. Engaging pins 42 and 43 are two forked ends of arms 45 and 46 of a fork 47. This fork is pivotally mounted at 48 by means of a pivot pin 50, passing through suitable apertures in a support 51 rigidly bolted to base plate 1.

In order to actuate fork 47, the two arms 45 and 46, at an intermediate point thereof, are rigidly joined by means of a pin 52 to a cam follower 55, disposed around a cam 56. Cam follower 55 preferably has one edge 57, overlapping the side of cam 56, and is locked in place over cam 56 by means of a spring ring 58 on the other side of this cam.

Cam 56 is rigidly mounted upon a shaft 60, journaled in bearings 61 and 62, mounted upon base plate 1. The end of shaft 60 carries a sprocket 63, which is rotated by any suitable source of power, such as an electric motor and sprocket chain.

An adjustment for fork 47 is provided in the form of a plurality—here shown as three—apertures 65, 66 and 67, through fork 47. When fork 47 is in the position shown in Figure 1, these apertures coincide with similar apertures in support 51. As shown, aperture 65 is actually used as the pivot point by having pin 50 passed therethrough. However, by shifting this pin to either of the other apertures, it is clear that the reciprocatory movement of shell 12, will be adjustably varied as far as its upper limit of travel is concerned. The lower limit of travel will remain the same under all conditions due to the collinear position of the various pivot positions and actuating point.

In order to actuate sleeve 38, a fork 70, having arms 71 and 72, is provided. These arms have forked ends which are adapted to engage pins 73 and 74, rigidly fastened to opposite sides of sleeve 38. Fork 70 is pivotally mounted at 75 by means of a bracket 76, bolted to the lower side of base plate 1. As indicated in Figure 3, bracket 76 is offset from bracket 51.

Fork 70 is oscillated about its pivot 75 by means of a crank 77, pivotally mounted at 78 to fork 70. Crank 77 terminates at its upper end in a block 80 provided with an interior slot 81.

Within slot 81 a movable block 82 is slidably mounted. This block 82 is provided in the lower portion thereof with a lateral cavity 83 and at its upper portion has an interior channel 84 drilled out. This channel is preferably tapped. Block 83 is adjustably mounted within interior slot 81 by means of a bolt 85 which is screwed into channel 84. Bolt 85 is supported at portion 86 of block 80 and is locked against downward displacement by means of a lock nut 87 and against upward displacement by nut 88.

Block 80 also has a lateral channel 90 in the lower portion thereof, this channel being similar in size to channel 83. Block 80 is also provided with a circular cutout 91, therethrough, in which region shaft 60 is adapted to rotate. Shaft 60 carries a cam 92 adjacent to block 80. A pair of pins 94 and 95 are rigidly mounted in channels 83 and 90 of block 80. Each of these pins carries a roller 96 and 97, which bears against diametrically opposed points on cam 92.

It is clear that when cam 92 tends to push roller 97 downwardly as viewed in Figure 5, that block 80 and rod 77 will be moved downwardly. When the cam is in its opposed position, with its high side above shaft 60 as in Figures 2, 5 and 8, block 80 will be moved upwardly. By adjusting the position of slidable member 82 in block 80, the position of roller 96 with relation to cam 92 is altered, with the result that the entire vertical position of block 80 is adjusted with respect to cam 92. Thus, if block 82 is pulled upwardly as in Figure 8, roller 96 is pulled upwardly reducing the rise of roller 96 when the cam strikes it. It is evident that block 82 tends to remain by virtue of the friction in the mechanism at the position last attained, in this instance the lowermost position. Since lower roller 97 has no adjustment, it is clear that block 80 will travel between a fixed lower and adjustable upper limit.

The motion of block 80 is transmitted through rod 77 and pin 78 to fork 90 and operates sleeve 38 between a fixed lower limit shown in Figure 4 and an adjustable upper limit as shown in Figure 1.

The varying degrees of adjustment for sleeve 12 are shown by arrows, A, B and C, which indicate where the three center lines from possible pivot points 65, 66 and 67, all passing through the same center point 100, intersect the center line of shell 12.

The two adjustments, D and E, are shown for the lower sleeve 38.

In Figure 7, a modification is shown wherein shell 12 is provided with a dome shaped head 112, having a plurality of ports 113 on the sides thereof. As shell 12 moves downwardly, ports 113 are closed by sleeve 13. Obviously in operation shell 12 and valve shell 38 are so moved relative to each other that when shell 12 is moved toward the hopper, valve shell 38 remains in closed position. When shell 12 is withdrawn away from the hopper, valve shell 38 is opened, the full opening preferably occurring near the end of the withdrawal stroke of shell 12. Cam 92 is suitably shaped so that when shell 12 begins to reverse and move toward the hopper, valve shell 38 is quickly closed. As previously pointed out, shell 12 communicates with the hopper only during its stroke toward the hopper.

The dismantling of the machine for cleaning is rendered convenient by the detachability of the pivot pins and backing off of the two forks from their respective pins. The entire mechanism may then be easily taken apart. The same is true of the reverse assembly process.

What we claim is:

1. A machine for forming doughnut blanks comprising a hopper adapted to contain a quantity of dough, a discharge throat for said hopper, a hollow member slidably mounted in said throat, and movable lengthwise thereof, means for reciprocating said member to induct a quantity of dough therein at one portion of its travel, a valve at the inlet side of said member adapted to be open during the induction portion of the travel of said member and being adapted to close said member from the hopper side during the remainder of the travel of said member, an annular discharge passage communicating with said hollow member, a valve controlling said annular passage and means whereby said valve is open when said first valve is closed and closed when said first valve is open.

2. A doughnut cutter comprising a hopper adapted to contain a quantity of dough, said hopper terminating in a throat, a hollow cylindrical member mounted in said throat and adapted to move lengthwise therein toward and away from said hopper, a valve mounted at the hopper side of said member and adapted to open when said member is projected toward said hopper and to close when said member is withdrawn therefrom, a discharge passage communicating with said hollow member, a valve for opening and closing said passage, said passage being annular for forming doughnut blanks, and means for operating said second valve, so that said second valve opens only when said hollow member moves away from said hopper and is closed when said hollow member moves toward said hopper.

3. The structure of claim 2 wherein means are provided for varying the range of travel of said hollow member, said entire adjustment only operating on the end position of the hollow member nearest the hopper.

4. A doughnut machine cutter comprising a hopper adapted to contain a quantity of dough, said dough remaining in said hopper under normal atmospheric pressure at all times, a discharge throat for said hopper, a hollow cylindrical member longitudinally movable in said throat, a valve carried by the throat end of said hollow member, said valve being unbiased and freely movable, whereby on the motion of said member toward said hopper, said valve is opened and permits dough to enter said member, and on the retractive travel of said member, said valve is closed, an exhaust chamber at all times communicating with said member having an annular discharge passage, a valve controlling said exhaust passage and means for operating said last named valve in synchronism with said hollow member to open said discharge passage only when said hollow member is moving away from said hopper.

5. The structure of claim 4 wherein means are provided for reciprocating said hollow member between a fixed point remote from said hopper and an adjustable point near said hopper.

6. The structure of claim 4, wherein means are provided for operating said hollow member from a fixed position remote from said hopper to an adjustable position near said hopper and wherein said last named valve is operated from a fixed closed position to an adjustable open position.

7. A doughnut machine comprising a hopper adapted to contain a quantity of dough, a discharge throat for said hopper, a hollow elongated sleeve disposed adjacent said throat with its channel in line with the throat of said hopper, a hollow member disposed in said sleeve and longitudinally movable therein toward and away from said throat, means for reciprocating said member, a valve carried by the throat end of said member and adapted to give access thereto from said throat and hopper during the movement of said member toward said throat and to close said hollow member upon movement of said member away from said throat, a discharge chamber in communication with said hollow member provided with a discharge passage, a valve for opening and closing said discharge passage and being adapted when open to form an annular discharge opening for shaping doughnut blanks, and means for moving said valve into discharge position when said hollow member is moved away from said throat and into a sealing position when said hollow member is moving toward said throat.

8. The structure of claim 7, wherein said discharge chamber is in the form of a cylinder having an annular discharge opening, and said valve comprises a sleeve slidable over said cylinder.

9. In a machine for making doughnut blanks the combination of a storage receptacle adapted to hold a supply of dough, a chambered member having an intake valve and an exhaust valve, said exhaust valve being adapted to shape a quantity of dough into a doughnut blank, means for moving at least a portion of said chambered member into said dough supply to fill said member with dough and means for retracting said portion of said member from said dough supply and simultaneously expelling a doughnut blank from said exhaust valve.

10. In a doughnut making machine, the combination of a storage receptacle for holding a dough supply, a chambered member having an intake opening and an exhaust opening, said last named opening being annular in shape for discharging a formed doughnut blank, means for projecting at least a portion of the wall of said member into said dough supply to draw a dough charge into said member and means for expelling a doughnut blank therefrom upon the withdrawal movement.

11. In a doughnut making machine, a chamber formed in part at least of two hollow telescoping members, said chamber being provided with an intake valve at one end and an annular discharge opening at the other end, a storage receptacle for holding a dough supply, means for moving one of said telescoping members into said dough supply for filling said chamber, means for covering said annular opening during said filling stroke and means for withdrawing said one telescoping member from said dough supply and uncovering said annular opening to discharge a doughnut blank.

12. In a doughnut making machine, an elongated stationary hollow member having an intake passage at one end and an annular discharge passage at the opposite end thereof, a hollow member open at each end thereof only telescopically mounted at each end of said first named member and adapted to reciprocate with respect to each end thereof, the telescoping member at the discharge end being adapted to open and close said discharge passage, an intake valve carried by the intake telescoping member at the outer end thereof, a dough receptacle adjacent said intake passage, means for projecting said intake telescoping member toward said dough receptacle to draw a charge into said first named member, means to maintain said discharge telescoping member in closed position during the projection movement of said intake member, means for retracting said intake member from said dough receptacle with said intake valve closed to shut off communication between said dough receptacle and first named member and means for moving said discharge telescoping member to uncover said discharge passage.

13. The structure of claim 12 wherein adjustable means are provided for projecting said intake telescoping member from a fixed point remote from said dough receptacle to an adjustable point near said dough receptacle, and wherein adjustable means are provided for moving said valve telescoping member from a fixed point at which said discharge passage is closed to an adjustable point for forming an adjustable discharge opening.

14. A doughnut blank forming machine comprising a vertically disposed hopper having a discharge throat at the lower end thereof, a hollow cylindrical sleeve below said throat and having a cylindrical channel in line with the discharge throat, a hollow cylindrical shell open at both ends thereof mounted for longitudinal movement within said sleeve, a valve carried by the upper end of said shell adapted to seal said shell and channel from said hopper during downward motion of said shell only, a valve sleeve slidably mounted on the lower end of said sleeve, the lower end of said sleeve being provided with an annular discharge passage, readily detachable means for reciprocating said shell and sleeve so that said sleeve maintains said discharge passage open during the downward travel of said shell only, said last means including a pair of forks with prongs embracing said shell and sleeve respectively.

15. The structure of claim 14 wherein one fork is provided with an adjustable pivot point and is actuated at a fixed point, said pivot point being so arranged that the adjustment only affects one end of the range of movement of said fork.

16. The structure of claim 14 wherein both forks are actuated by a pair of cams disposed side by side on one shaft, and adjustable leverage systems connecting said cams and forks for actuating the latter, said adjustments being adapted to start said shell and valve sleeve from fixed lower and closed positions respectively to adjustable upper and open positions.

17. The structure of claim 14 wherein one fork is actuated by a cam, a follower therefor, and a leverage system including a lost motion device.

18. In a doughnut cutter, a hopper having a discharge throat, a cylindrical shell having a passage in line with said throat, a hollow sleeve in said shell slidable lengthwise thereof, said shell having an open bottom and closed top, ports in the side thereof, said ports cooperating with said throat to be opened in the upward position of said shell, said shell having a discharge opening at the bottom thereof, a valve cooperating with said bottom to form an annular discharge passage in the open position of said valve and means for reciprocating said shell and valve so that said valve is in its closed position when said shell moves toward said hopper and open on reverse movement.

CHARLES E. CARPENTER.
DAVID B. SCOVILLE.